(12) United States Patent
Kim et al.

(10) Patent No.: US 12,200,436 B2
(45) Date of Patent: Jan. 14, 2025

(54) ELECTRONIC DEVICE INCLUDING SOUND MODULE

(71) Applicant: Samsung Electronics Co., Ltd., Suwon-si (KR)

(72) Inventors: Yeongjun Kim, Suwon-si (KR); Jiho Lee, Suwon-si (KR); Myoungsung Sim, Suwon-si (KR); Hunki Lee, Suwon-si (KR); Minwoo Yoo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 93 days.

(21) Appl. No.: 17/978,534

(22) Filed: Nov. 1, 2022

(65) Prior Publication Data

US 2023/0136399 A1    May 4, 2023

Related U.S. Application Data

(63) Continuation of application No. PCT/KR2022/016832, filed on Oct. 31, 2022.

(30) Foreign Application Priority Data

Nov. 2, 2021   (KR) .......................... 10-2021-0148853

(51) Int. Cl.
  *H04R 1/34*   (2006.01)
  *H04R 1/02*   (2006.01)
(52) U.S. Cl.
  CPC ............. *H04R 1/345* (2013.01); *H04R 1/028* (2013.01); *H04R 2400/11* (2013.01); *H04R 2499/11* (2013.01); *H04R 2499/15* (2013.01)
(58) Field of Classification Search
  CPC .... H04R 1/345; H04R 1/028; H04R 2400/11; H04R 2499/11; H04R 2499/15;
(Continued)

(56) References Cited

U.S. PATENT DOCUMENTS

| 11,490,190 B1 | 11/2022 | Leonhardt et al. |
| 2012/0243719 A1 | 9/2012 | Franklin et al. |

(Continued)

FOREIGN PATENT DOCUMENTS

| CN | 108632419 B | 11/2019 | |
| JP | 2013239788 A | * 11/2013 | .............. H04M 1/02 |

(Continued)

OTHER PUBLICATIONS

International Search Report dated Jan. 26, 2023, issued in International Application No. PCT/KR2022/016832.

(Continued)

*Primary Examiner* — Oyesola C Ojo
(74) *Attorney, Agent, or Firm* — Jefferson IP Law, LLP

(57) ABSTRACT

An electronic device is provided. The electronic device includes a sound module, a support member including an accommodation space to accommodate the sound module, a display module disposed above the support member, and a duct structure to deliver sound generated in the sound module to the outside, the duct structure including an inlet space formed to be at least partially surrounded by the support member and positioned between the sound module and the display module, a first conduit branched from the inlet space in a first direction and formed to extend through at least a part of the support member, a second conduit disposed side by side with the first conduit, branched from the inlet space in a second direction, and formed along between the display module and the support member, and an output space connected to the first conduit and the second conduit and disposed adjacent to an outlet of the sound.

20 Claims, 13 Drawing Sheets

(58) Field of Classification Search
CPC ...... H04R 1/28; H04R 1/2803; H04R 1/2853; G06F 1/16; G06F 1/1628; G06F 1/1656; G06F 1/1688
See application file for complete search history.

(56) References Cited

U.S. PATENT DOCUMENTS

| | | | | |
|---|---|---|---|---|
| 2013/0033401 | A1* | 2/2013 | Kim | H04M 1/035 |
| | | | | 343/702 |
| 2013/0170688 | A1* | 7/2013 | Cohen | H04R 1/30 |
| | | | | 381/351 |
| 2017/0251291 | A1* | 8/2017 | Nakamura | H04R 1/083 |
| 2019/0037294 | A1* | 1/2019 | Hung | H04R 1/025 |
| 2019/0166422 | A1* | 5/2019 | Cho | H04M 1/03 |
| 2020/0045395 | A1* | 2/2020 | Wu | H04R 1/023 |
| 2021/0006876 | A1 | 1/2021 | Moon et al. | |
| 2021/0120114 | A1* | 4/2021 | Li | H04M 1/035 |
| 2021/0144458 | A1* | 5/2021 | Zhang | H04R 1/02 |
| 2021/0250670 | A1 | 8/2021 | Jun et al. | |
| 2022/0046345 | A1 | 2/2022 | Mai | |

FOREIGN PATENT DOCUMENTS

| | | | | |
|---|---|---|---|---|
| JP | 2016213671 A | * | 12/2016 | ............ H04M 1/02 |
| KR | 10-2011-0090697 A | | 8/2011 | |
| KR | 20110090697 A | * | 8/2011 | ............ H04R 1/02 |
| KR | 10-2017-0119461 A | | 10/2017 | |
| WO | 2020/215993 A1 | | 10/2020 | |
| WO | 2021/158007 A1 | | 8/2021 | |

OTHER PUBLICATIONS

Extended European Search Report dated Oct. 23, 2024; European Appln. No. 22890310.0-1218 / 4369143 PCT/KR2022016832.

* cited by examiner

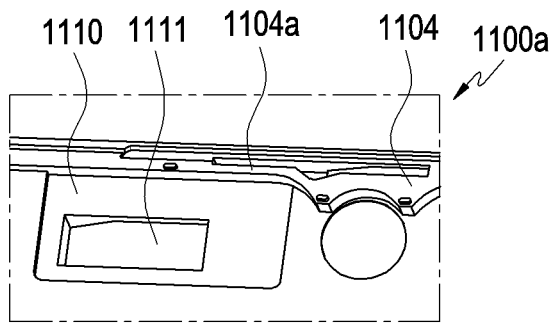
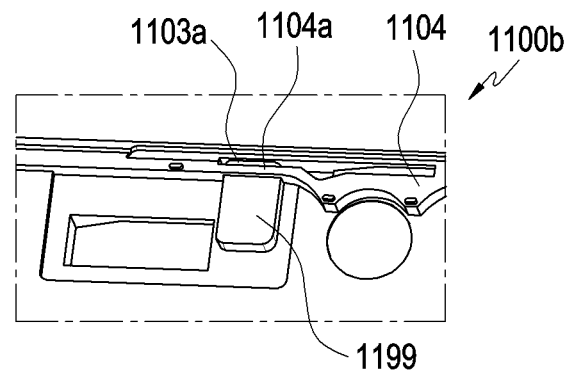
FIG. 13A  FIG. 13B
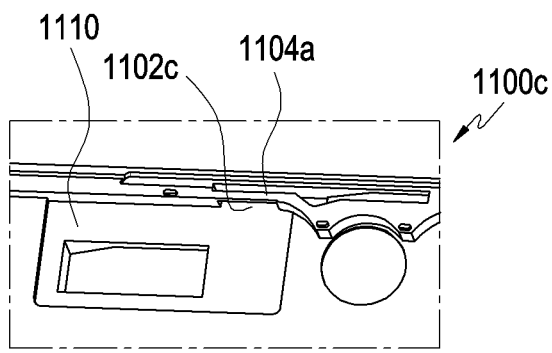
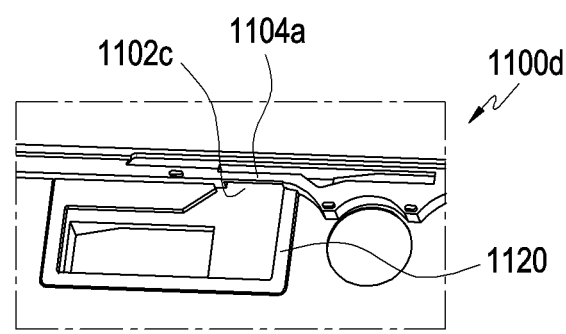
FIG. 13C  FIG. 13D
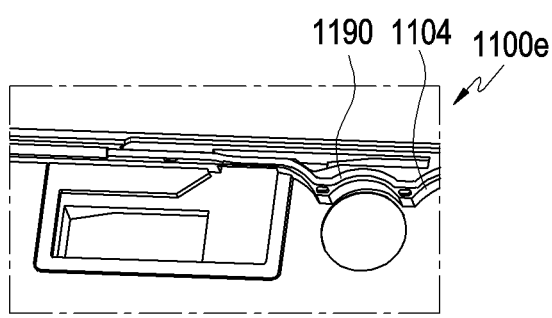
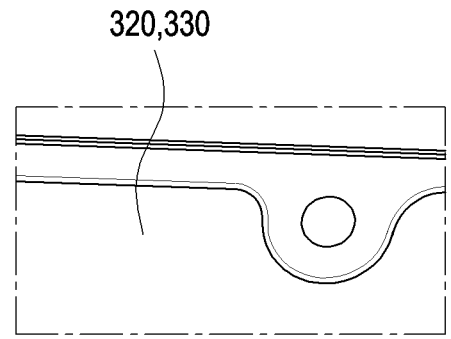
FIG. 13E  FIG. 13F

ELECTRONIC DEVICE INCLUDING SOUND MODULE

CROSS-REFERENCE TO RELATED APPLICATION(S)

This application is a continuation application, claiming priority under § 365(c), of an International application No. PCT/KR2022/016832, filed on Oct. 31, 2022, which is based on and claims the benefit of a Korean patent application number 10-2021-0148853, filed on Nov. 2, 2021, in the Korean Intellectual Property Office, the disclosure of which is incorporated by reference herein in its entirety.

TECHNICAL FIELD

The disclosure relates to an electronic device. More particularly, the disclosure relates to an electronic device including a sound module.

BACKGROUND ART

In line with development of electronics, information, and communication technologies, various functions tend to be integrated in a single electronic device. For example, smartphones include not only a communication function, but also functions of sound players, imaging devices, or electronic wallets, and more diversified functions may be implemented in smartphones by installing additional applications. An electronic device may not only execute installed applications or stored files, but also access a server or another electronic device in a wired or wireless manner so as to receive various kinds of information in real time.

Electronic devices are carried and used by users in daily life, and there are thus increasing demands for compactness of electronic devices. Moreover, there are increasing user demands regarding multimedia quality, including communication performance, data processing rates, and sound performance.

The above information is presented as background information only to assist with an understanding of the disclosure. No determination has been made, and no assertion is made, as to whether any of the above might be applicable as prior art with regard to the disclosure.

DETAILED DESCRIPTION OF THE INVENTION

Technical Problem

A sound module including a microphone or a speaker module may secure (receive) or output a higher quality of sounds as the same is closer to the hole in the exterior of the electronic device through which sounds are actually input and/or output, or as the sound input and/or output hole has an expanded size. However, the sound input and/or output hole is disposed near the display module, and the display screen size may be reduced as the hole size is expanded.

Aspects of the disclosure are to address at least the above-mentioned problems and/or disadvantages and to provide at least the advantages described below. Accordingly, an aspect of the disclosure is to provide an electronic device including a sound module having improved sound quality in connection with a speaker module mounting structure, for example.

Another aspect of the disclosure is to provide an electronic device including a sound module which can be easily assembled, and which has a stable coupling structure with other components.

Technical Solution

In accordance with an aspect of the disclosure, an electronic device is provided. The electronic device includes a sound module, a support member including an accommodation space configured to accommodate the sound module, a display module disposed above the support member, and a duct structure configured to deliver sound generated in the sound module to the outside, wherein the duct structure includes an inlet space formed to be at least partially surrounded by the support member and positioned between the sound module and the display module such that sound generated in the sound module is introduced therein, a first conduit branched from the inlet space in a first direction and formed to extend through at least a part of the support member, a second conduit disposed side by side with the first conduit, branched from the inlet space in a second direction, and formed along between the display module and the support member, and an output space connected to the first conduit and the second conduit and disposed adjacent to an outlet of the sound, and wherein the first conduit and the second conduit have lengths corresponding to each other.

In accordance with another aspect of the disclosure, an electronic device is provided. The electronic device includes a sound module, a support member including an accommodation space formed on a rear surface thereof so as to accommodate the sound module, a display module disposed on an upper surface of the support member, and a duct structure configured to deliver sound generated in the sound module to the outside, wherein the duct structure includes an inlet space formed to extend from the accommodation space to the upper surface of the support member along a first direction and configured to allow sound generated in the sound module to be introduced thereinto, a first conduit branched from the inlet space and formed to extend through at least a part of a front case in a second direction different from the first direction, a second conduit formed along between the display module and the front case and branched from the inlet space along the second direction, and an output space formed between the display module and a side wall of the support member, connected to the first conduit and the second conduit such that sound travelling through the first conduit and sound travelling through the second conduit overlap each other, and wherein travel paths of sound travelling through the first conduit and sound travelling through the second conduit have a substantially identical length.

Advantageous Effects

According to various embodiments, an electronic device may have a duct structure for providing multiple sound paths such that high-quality sounds can be provided while maintaining the display screen size.

According to various embodiments, an electronic device may have improved dustproof/waterproof performance through a stable coupling structure of a sound module mounting structure.

BRIEF DESCRIPTION OF DRAWINGS

FIGS. 13A, 13B, 13C, 13D, 13E, and 13F are views showing a duct structure and a manufacturing process thereof according to various embodiments of the disclosure.

MODE FOR CARRYING OUT THE INVENTION

Figure 1:
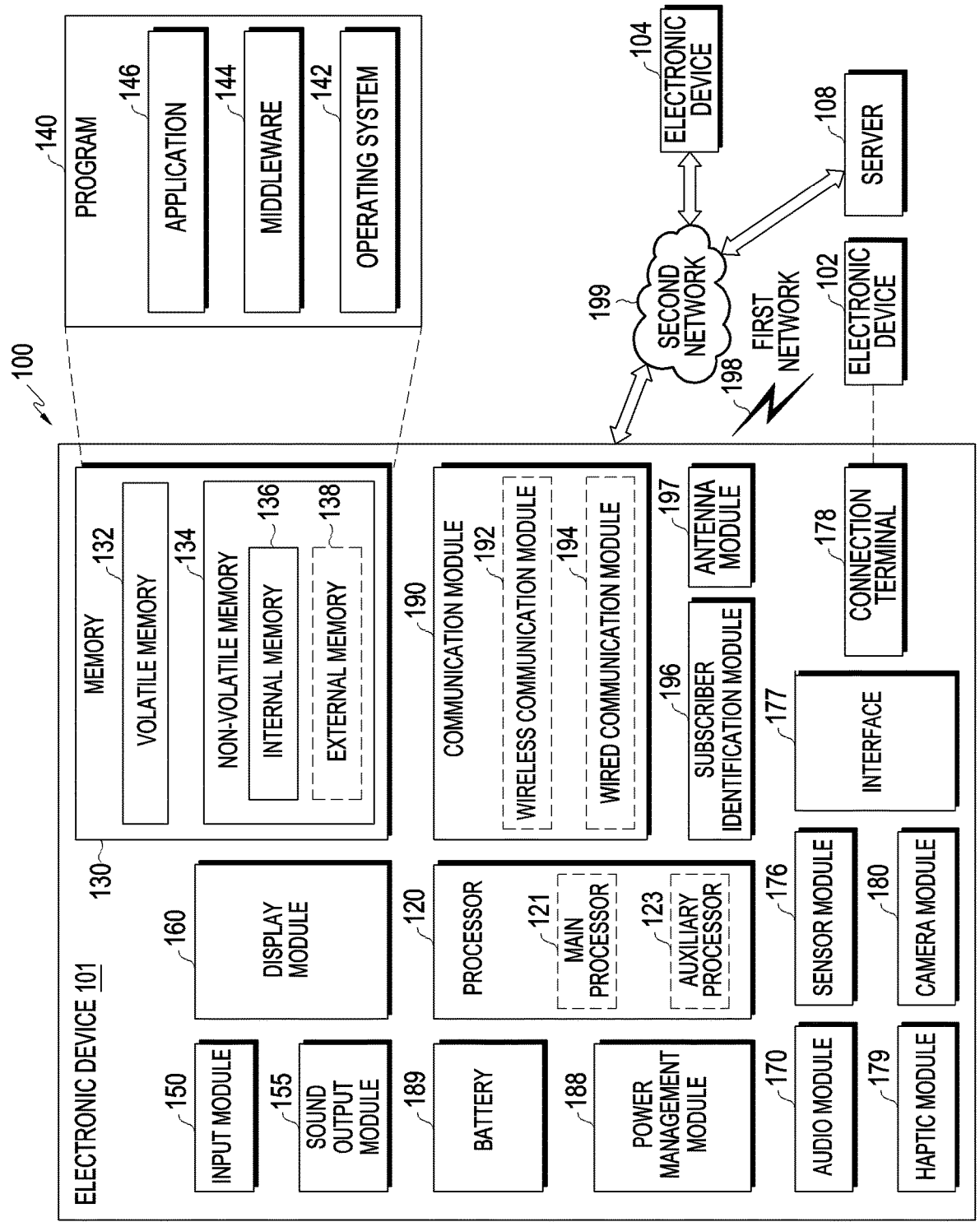
FIG. 1 is a block diagram of an electronic device in a network environment according to an embodiment of the disclosure.

Various changes and modifications may be made to the disclosure, and the disclosure may have various embodiments, some of which will be described in detail with reference to the accompanying drawings. However, it should be appreciated that they are not intended to limit the disclosure to particular embodiments and the disclosure include various changes, equivalents, or alternatives falling within the sprit and scope of the disclosure.

With regard to the description of the drawings, similar reference numerals may be used to designate similar or relevant elements. A singular form of a noun corresponding to an item may include one or more of the items, unless the relevant context clearly indicates otherwise. As used herein, each of such phrases as "A or B," "at least one of A and B," "at least one of A or B," "A, B, or C," "at least one of A, B, and C," and "at least one of A, B, or C" may include all possible combinations of the items enumerated together in a corresponding one of the phrases. The terms including an ordinal number, such as expressions "a first" and "a second" may be used to described various elements, but the corresponding elements should not be limited by such terms. These terms are used merely to distinguish between one element and any other element. For example, a first element may be termed a second element, and similarly, a second element may be termed a first element without departing from the scope of the disclosure. The term "and/or" includes a combination or any one of a plurality of relevant items enumerated. It is to be understood that if an element (e.g., a first element) is referred to, with or without the term "operatively" or "communicatively", as "coupled with/to" or "connected with/to" another element (e.g., a second element), it means that the element may be coupled/connected with/to the other element directly (e.g., wiredly), wirelessly, or via a third element.

Further, relative terms described as viewed from the drawings, such as "front surface", "rear surface", "top surface", and "bottom surface", may be replaced by ordinal numbers such as "first" and "second". In the ordinal numbers such as "first" and "second", the order of them is determined in the mentioned order or arbitrarily and may be arbitrarily changed as necessary.

The terms used in the disclosure are merely used to describe specific embodiments, and are not intended to limit the disclosure. A singular expression may include a plural expression unless they are definitely different in a context. As used herein, the expression "include" or "have" are intended to specify the existence of mentioned features, numbers, steps, operations, elements, components, or combinations thereof, and should be construed as not precluding the possible existence or addition of one or more other features, numbers, steps, operations, elements, components, or combinations thereof.

Unless defined otherwise, all terms used herein, including technical and scientific terms, have the same meaning as those commonly understood by a person skilled in the art to which the disclosure pertains. Such terms as those defined in a generally used dictionary may be interpreted to have the meanings equal to the contextual meanings in the relevant field of art, and are not to be interpreted to have ideal or excessively formal meanings unless clearly defined in the disclosure. In some cases, even the term defined in the disclosure should not be interpreted to exclude embodiments of the disclosure.

In the disclosure, an electronic device may be any device, and the electronic device may be called a terminal, a portable terminal, a mobile terminal, a communication terminal, a portable communication terminal, a portable mobile terminal, a display device, or the like.

For example, the electronic device may be a smartphone, a mobile phone, a navigation device, a game player, a TV, a head unit for a vehicle, a notebook computer, a laptop computer, a tablet personal computer (PC), a personal media player (PMP), a personal digital assistant (PDA), and the like. The electronic device may be implemented as a packet-sized portable communication terminal with a wireless communication function. Further, the electronic device may be a flexible device or a flexible display device.

The electronic device may communicate with an external electronic device such as a server, or perform an operation by interworking with the external electronic device. For example, the electronic device may transmit an image photographed by a camera and/or position information detected by a sensor unit to the server via a network. The network may include, but not limited to, a mobile or cellular communication network, a local area network (LAN), a wireless local area network (WLAN), a wide area network (WAN), an Internet, a small area network (SAN), or the like.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134; the non-volatile memory 134 includes an internal memory 136 and an external memory 138. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 79 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 8 coupled with the second network 199. Each of the external electronic devices 102 or 104 may be a device of a same type as, or a different type, from the electronic device 101. According to an embodiment, all or some of operations to be executed at the electronic device 1 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
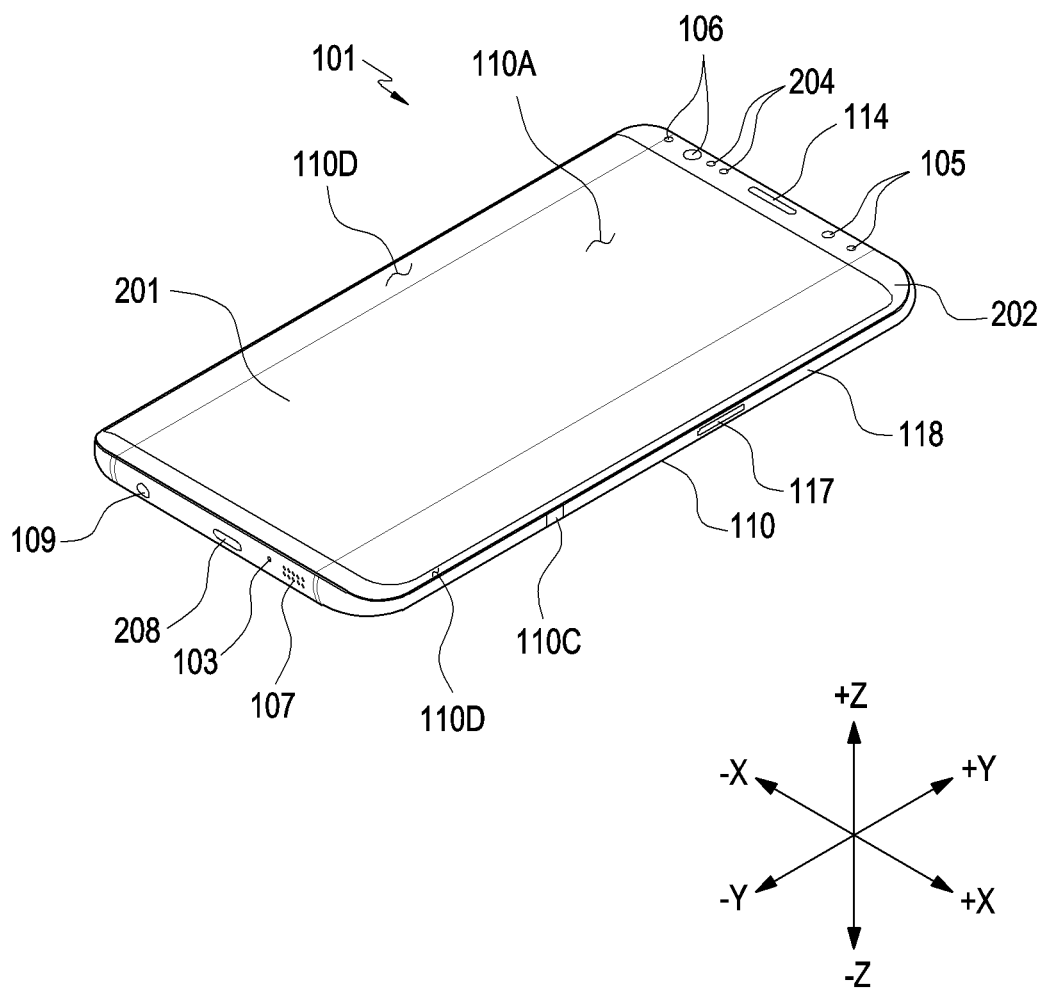
FIG. 2 is a front perspective view of an electronic device according to an embodiment of the disclosure.
Figure 3:
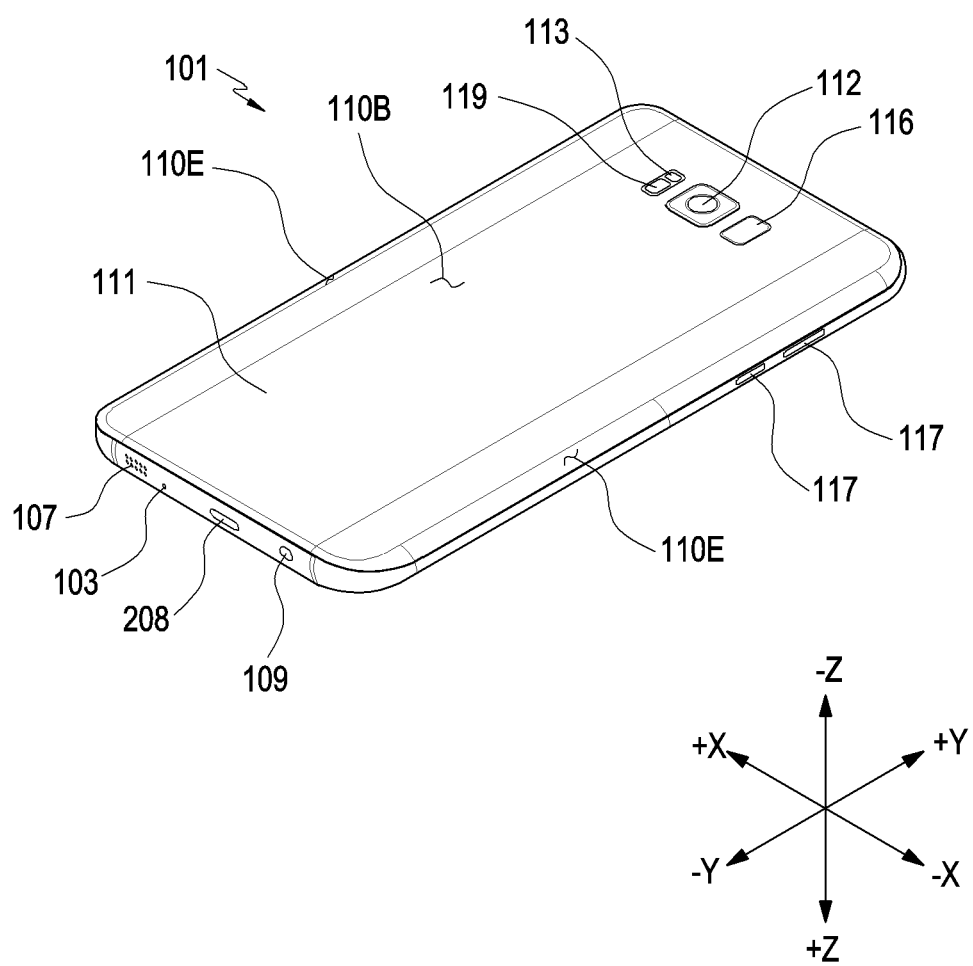
FIG. 3 is a rear perspective view of the electronic device illustrated in FIG. 2 according to an embodiment of the disclosure.

FIG. 2 is a front perspective view of an electronic device 101 according to an embodiment of the disclosure. FIG. 3 is a rear perspective view of the electronic device 101 illustrated in FIG. 2 according to an embodiment of the disclosure.

Referring to FIGS. 2 and 3, an electronic device 101 according to an embodiment may include a first surface (or a front surface) 110A, a second surface (or a rear surface) 110B, and a housing 110 including a side surface 110C configured to surround the space between the first surface 110A and the second surface 110B. In another embodiment (not shown), the housing may be referred to as a structure which forms a part of the first surface 110A, the second surface 110B, and the side surface 110C of FIG. 1. According to an embodiment, the first surface 110A may be formed by a front plate 202 (e.g., a glass plate including various coating layers, or a polymer plate) of which at least a portion is substantially transparent. The second surface 110B may be formed by a substantially opaque rear plate 111. For example, the rear plate 111 may be formed by coated or colored glass, ceramic, polymer, metal (e.g., aluminum, stainless steel (STS), or magnesium), or a combination of at least two of the above materials. The side surface 110C may be coupled to the front plate 202 and the rear plate 111, and may be formed by a side-surface bezel structure (or "a side-surface member") 118 including metal and/or polymer. In some embodiments, the rear plate 111 and the side-surface bezel structure 118 may be integrally formed, and may include the same material (e.g., a metal material such as aluminum).

In the illustrated embodiment, the front plate 202 may include two first areas 110D which are provided in opposite long edge ends of the front plate 202 and configured to be bent from the first surface 110A toward the rear plate 111 and to extend seamlessly (see FIG. 3), the rear plate 111 may include two second areas 110E which are provided in opposite long edge ends thereof and configured to be bent from the second surface 110B toward the front plate 202 and to extend seamlessly. In some embodiments, the front plate 202 (or the rear plate 111) may include only one of the first areas 110D (or the second areas 110E). In another embodiment, a part of the first areas 110D or the second areas 110E may not be included therein. In the embodiments, when seen from the side surface of the electronic device 101, the side-surface bezel structure 118 may have a first thickness (or width) in the side-surface side not including the first areas 110D or the second areas 110E, and may have a second thickness thinner than the first thickness, in the side-surface side including the first areas 110D or the second areas 110E.

According to an embodiment, the electronic device 101 may include at least one of a display 201, audio modules 103, 107, and 114, sensor modules 204, 116 and 119, camera modules 105, 112, and 113, a key input device 117, a light-emitting element 106, and connector holes 208 and 109. In some embodiments, at least one (e.g., the key input device 117 or the light-emitting element 106) of elements thereof may be omitted from the electronic device 101, or other elements may be additionally included therein.

For example, the display 201 may be exposed through a substantial portion of the front plate 202. In some embodiments, at least a part of the display 201 may be exposed through the front plate 202 configured to form the first surface 110A and the first areas 110D of the side surface 110C. In some embodiments, the corners of the display 201 may be formed to have a shape substantially the same as the outer shape of the front plate 202 adjacent thereto. In another embodiment (not shown), in order to expand an area which allows the display 201 to be exposed, the gap between the outer perimeter of the display 201 and the outer perimeter of the front plate 202 may be formed to be substantially the same.

In another embodiment (not shown), a recess or an opening may be formed in a part of a screen display area of the display 201, and at least one of the audio module 114, the sensor module 204, the camera module 105, and the light-emitting element 106, which are aligned with the recess or the opening, may be included therein. In another embodiment (not shown), at least one of the audio module 114, the sensor module 204, the camera module 105, a fingerprint sensor 116, and the light-emitting element 106 may be included on the rear surface of the screen display area of the display 201. In another embodiment (not shown), the display 201 may be coupled to or disposed adjacent to a touch detection circuit, a pressure sensor capable of measuring the intensity (pressure) of touch, and/or a digitizer for detecting a magnetic field-type stylus pen. In some embodiments, at least a part of the sensor module 204 or 119, and/or at least a part of a key input device 117 may be positioned in the first areas 110D and/or the second areas 110E.

The audio modules 103, 107, and 114 may include a microphone hole 103 and speaker holes 107 and 114. A microphone for acquiring external sound may be disposed inside the microphone hole 103, and in some embodiments, multiple microphones may be arranged to detect the direction of sound. The speaker holes 107 and 114 may include an external speaker hole 107 and a receiver hole 114 for a call. In some embodiments, the speaker holes 107 and 114 and the microphone hole 103 may be implemented as one hole, or only a speaker (e.g., a piezo speaker) may be included without the speaker holes 107 and 114.

The sensor modules 204, 116, and 119 may be configured to generate an electrical signal or a data value corresponding to an internal operation state of the electronic device 101 or an external environmental state. For example, the sensor modules 204, 116, and 119 may include a first sensor module 204 (e.g., a proximity sensor) disposed on the first surface 110A of the housing 110 and/or a second sensor module (not shown) (e.g., a fingerprint sensor), and/or a third sensor module 119 (e.g., an HRM sensor) disposed on the second surface 110B of the housing 110 and/or a fourth sensor module 116 (e.g., a fingerprint sensor). The fingerprint sensor may be disposed on not only the first surface 110A (e.g., the display 201) but also the second surface 110B of the housing 110. The electronic device 101 may further include a sensor module not illustrated therein, for example, at least one of a gesture sensor, a gyro sensor, a barometric pressure sensor, a magnetic sensor, an acceleration sensor, a grip sensor, a color sensor, an infrared (IR) sensor, a biometric sensor, a temperature sensor, a humidity sensor, or an illuminance sensor 204.

The camera modules 105, 112, and 113 may include a first camera device 105 disposed on the first surface 110A of the electronic device 101, and a second camera device 112 and/or a flash 113 arranged on the second surface 110B. The camera devices 105 and 112 each may include one lens or multiple lenses, an image sensor, and/or an image signal processor. For example, the flash 113 may include a light-emitting diode or a xenon lamp. In some embodiments, two or more lenses (an infrared camera, a wide-angle lens, and a telephoto lens) and image sensors may be arranged on one surface of the electronic device 101.

The key input device 117 may be disposed on the side surface 110C of the housing 110. In another embodiment, the electronic device 101 may not include a part or all among key input devices 117 mentioned above, and the key input device 117 not included therein may be implemented as a different type such as a soft key, on the display 201. In some embodiments, the key input device may include the sensor module 116 disposed on the second surface 110B of the housing 110.

For example, the light-emitting element 106 may be disposed on the first surface 110A of the housing 110. For example, the light-emitting element 106 may be configured to provide state information of the electronic device 101 in the form of light. In another embodiment, for example, the light-emitting element 106 may be configured to provide a light source interlocked with an operation of the camera module 105. For example, the light-emitting element 106 may include an LED, an IR LED, and a xenon lamp.

The connector holes 208 and 109 may include a first connector hole 208 capable of accommodating a connector (for example, a USB connector) for transmitting and receiving power and/or data to and from an external electronic device, and/or a second connector hole 109 (for example, an earphone jack) capable of accommodating a connector for transmitting and receiving audio signals to and from an external electronic device.

Figure 4:
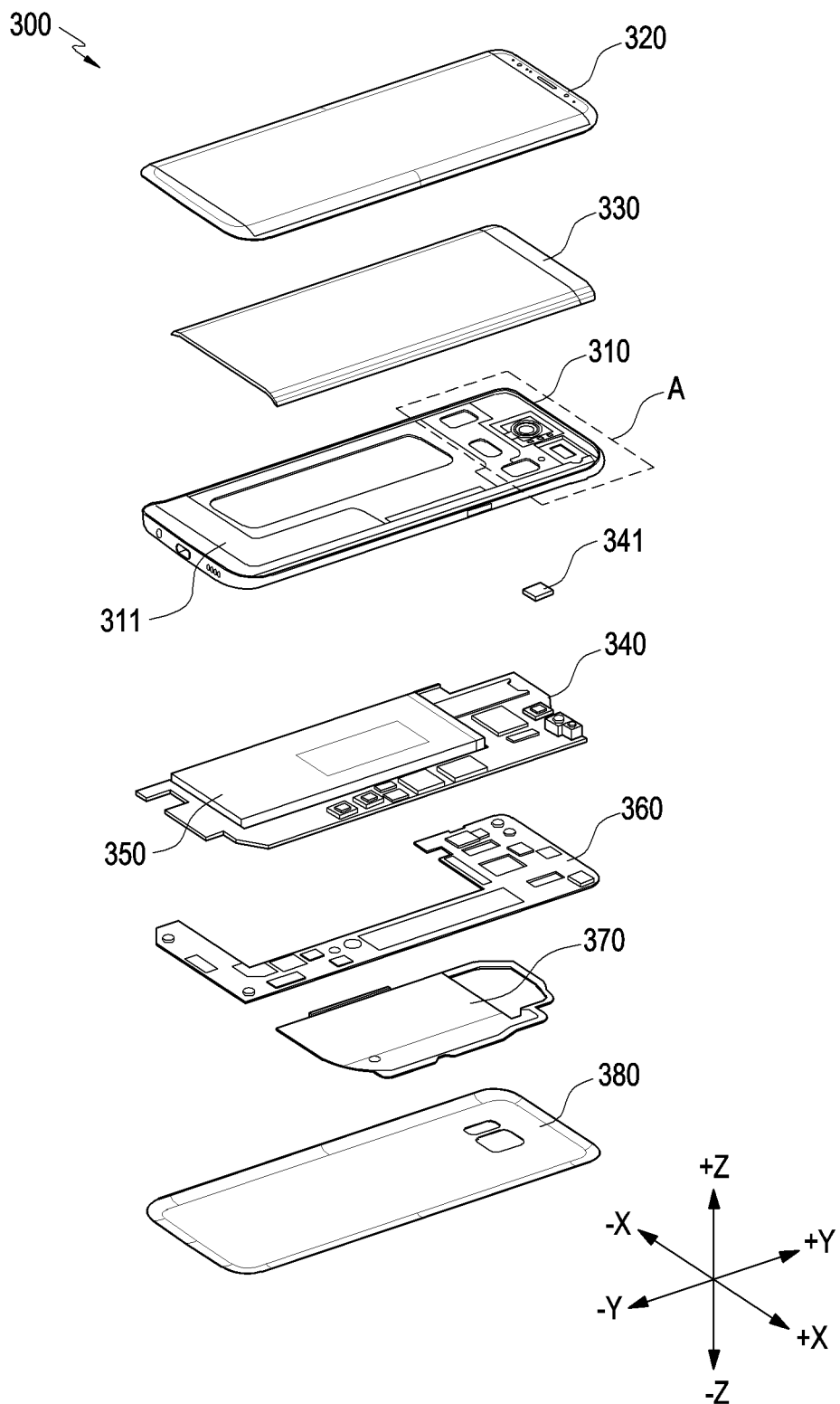
FIG. 4 is an exploded perspective view of the electronic device illustrated in FIG. 2 according to an embodiment of the disclosure.

FIG. 4 is an exploded perspective view of the electronic device illustrated in FIGS. 2 and 3 according to an embodiment of the disclosure.

Referring to FIG. 4, the electronic device 300 may include a side-surface bezel structure 310, a support member 311 (e.g., a bracket), a front plate 320, a display 330, a printed circuit board 340, a battery 350, a rear support member 360 (e.g., a rear case), an antenna 370, a sound module 341, and a rear plate 380. In some embodiments, at least one (e.g., the support member 311 or the rear support member 360) of elements thereof may be omitted from the electronic device 300, or other elements may be additionally included therein. At least one of elements of the electronic device 300 may be the same as or similar to at least one of elements of the electronic device 101 of FIG. 1 or 2, and overlapping descriptions will be omitted hereinafter.

The support member 311 may be disposed inside the electronic device 300 to be connected to the side-surface bezel structure 310 or to be integrally formed with the side-surface bezel structure 310. For example, the first support member 311 may be formed of a metal material and/or a non-metal (e.g., polymer) material. The support member 311 may have one surface to which the display 330 is coupled, and the other surface to which the printed circuit board 340 is coupled. The printed circuit board 340 may have a processor, a memory, and/or an interface, which are mounted thereon. For example, the processor may include one or more of a central processing unit, an application processor, a graphic processing unit, an image signal processor, a sensor hub processor, or a communication processor.

For example, the memory may include a volatile memory or a non-volatile memory.

For example, the interface may include a high definition multimedia interface (HDMI), a universal serial bus (USB) interface, an SD card interface, and/or an audio interface. For example, the interface may be configured to electrically or physically connect the electronic device 300 to an external electronic device, and may include a USB connector, an SD card/MMC connector, or an audio connector.

The battery 350 may be a device of configured to supply power to at least one element of the electronic device 300, and for example, may include a non-rechargeable primary cell, a rechargeable secondary cell, or a fuel cell. For example, at least a part of the battery 350 may be disposed on substantially the same plane as the printed circuit board 340. The battery 350 may be integrally disposed inside the electronic device 300, or may be disposed to be detachable/attachable from/to the electronic device 300.

The antenna 370 may be disposed between the rear plate 380 and the battery 350. For example, the antenna 370 may include a near field communication (NFC) antenna, a wireless charging antenna, and/or a magnetic secure transmission (MST) antenna. For example, the antenna 370 may be configured to perform a short-range communication with an external device, or may be configured to transmit/receive a power required for charging in a wireless. In another embodiment, an antenna structure may be formed by a part of the side-surface bezel structure 310 and/or the first support member 311, or a combination thereof.

The sound module 341 may be positioned between the printed circuit board 340 and the support member 311. According to an embodiment, the sound module 341 may mean various configurations for emitting or sensing sound. For example, the sound module 341 may be a speaker, a microphone, or a receiver.

According to various embodiments, the electronic device 300 may include a duct structure (e.g., the duct structure 10, 11, or 12 of FIGS. 5 to 11, 12A to 12C, and 13A to 13F) configured to provide a sound deliver path from the inside to the outside (or vice versa) of the electronic device 300. For example, the duct structure (e.g., the duct structure 10, 11, or 12 of FIGS. 5 to 11, 12A to 12C, and 13A to 13F) may be configured to provide a sound output path which allows sound emitted from the sound module 341 to be output to the outside of the electronic device 300, or a sound input path which allows sound from the outside of the electronic device 300 to be input to the sound module 341. According to an embodiment, the duct structure 10, 11, or 12 may be provided by an arrangement relationship or a combination of multiple elements included in the electronic device 300. For example, the duct structure 10, 11, or 12 may be provided by an arrangement relationship or a combination of at least a part the front plate 320, the display module 330, the support member 311, the sound module 341, and the rear plate 380. For another example, the duct structures 10, 11, and 2 may be provided by cutting-processing or injection-molding all or a part of the front plate 320, the display module 330, the support member 311, the sound module 341, and the rear plate 380.

According to an embodiment, the support member 311 may include a duct area A. The duct area A may mean a portion of the support member 311 configured to provide a duct structure (e.g., the duct structure 10, 11, or 12 of FIGS. 5 to 11, 12A to 12C, and 13A to 13F). The duct structure (e.g., the duct structure 10, 11, or 12 of FIGS. 5 to 11, 12A to 12C, and 13A to 13F) according to various embodiments of the disclosure may be provided by an arrangement relationship or a combination between the duct area A and multiple elements of the electronic device 300 described above. In the description of the following embodiments of the disclosure, the relationship between the duct area A and other elements will be mainly described, but it may be merely an example and embodiments may be variously changed. For example, the duct area A may be provided in all or a part of the front plate 320, the display module 330, and/or the rear plate 380. That is, the configuration of the support member 400, 1000, or 1100 to be described later through FIGS. 5 to 11, 12A to 12C, and 13A to 13F may be applied to various configurations in the electronic device 200. In addition, the duct area A may be provided in the electronic device 200 by a separate component.

In addition, for the convenience of explanation, in the descriptions of the following embodiments of the disclosure, the description for a support member (e.g., the support member 400 of FIGS. 5 to 11, the support member 1000 of FIGS. 12A to 12C, and/or the support member 1100 of FIGS. 13A to 13F) may be applied correspondingly to the description for the support member 311 or the duct area A of FIG. 4.

In the following description of the disclosure, the duct structure 10, which is configured to provide a sound delivery path of the electronic device 300, will be described with reference to the drawings.

First, according to various embodiments, the support member constituting the duct structure 10 and various embodiments including various elements coupled to the support member will be described with reference to FIGS. 5 and 6.

First, in the following description of this disclosure, it will be mainly described that a sound output path from the sound module 341 to the outside of the electronic device 200, which is provided by the duct structure (e.g., the duct structure 10, 11, or 12 of FIGS. 5 to 11, 12A to 12C, and 13A to 13F) will be described with reference to FIGS. 5 and 6. However, it may be merely an example. As an example, when the sound module 341 is provided as a sound input module such as a microphone, the same description may be applied to the sound input path which allows sound to be delivered from the outside of the electronic device 200 to the sound module 341, and description of embodiments of the disclosure should not be interpreted as being limited to terms.

Figure 5:
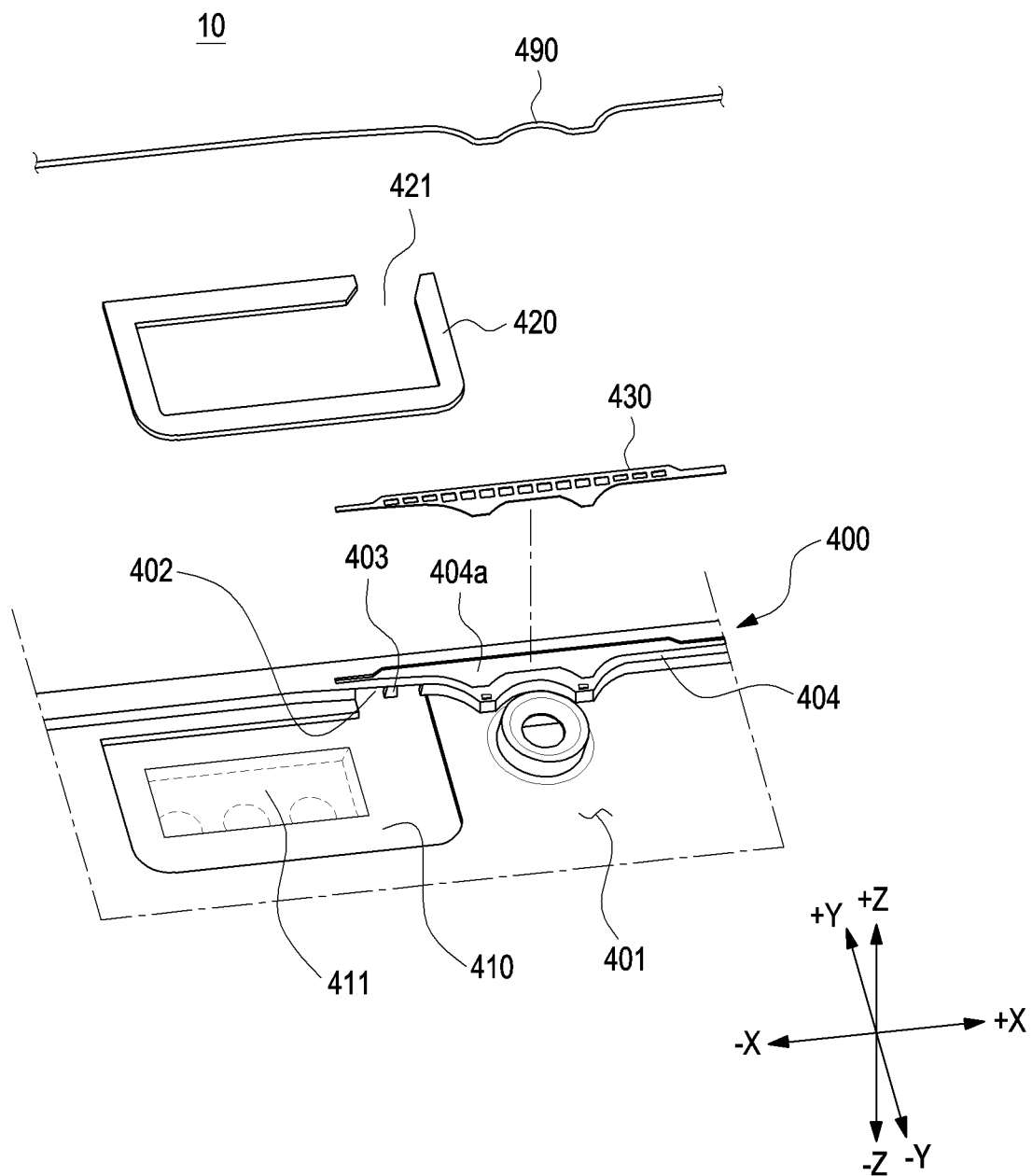
FIG. 5 is an exploded perspective view showing a part of a duct structure according to an embodiment of the disclosure.

FIG. 5 is an exploded perspective view showing a part of a duct structure according to an embodiment of the disclosure. FIG. 6 is a view showing a support member to which elements of FIG. 4 are coupled according to an embodiment of the disclosure.

Figure 6:
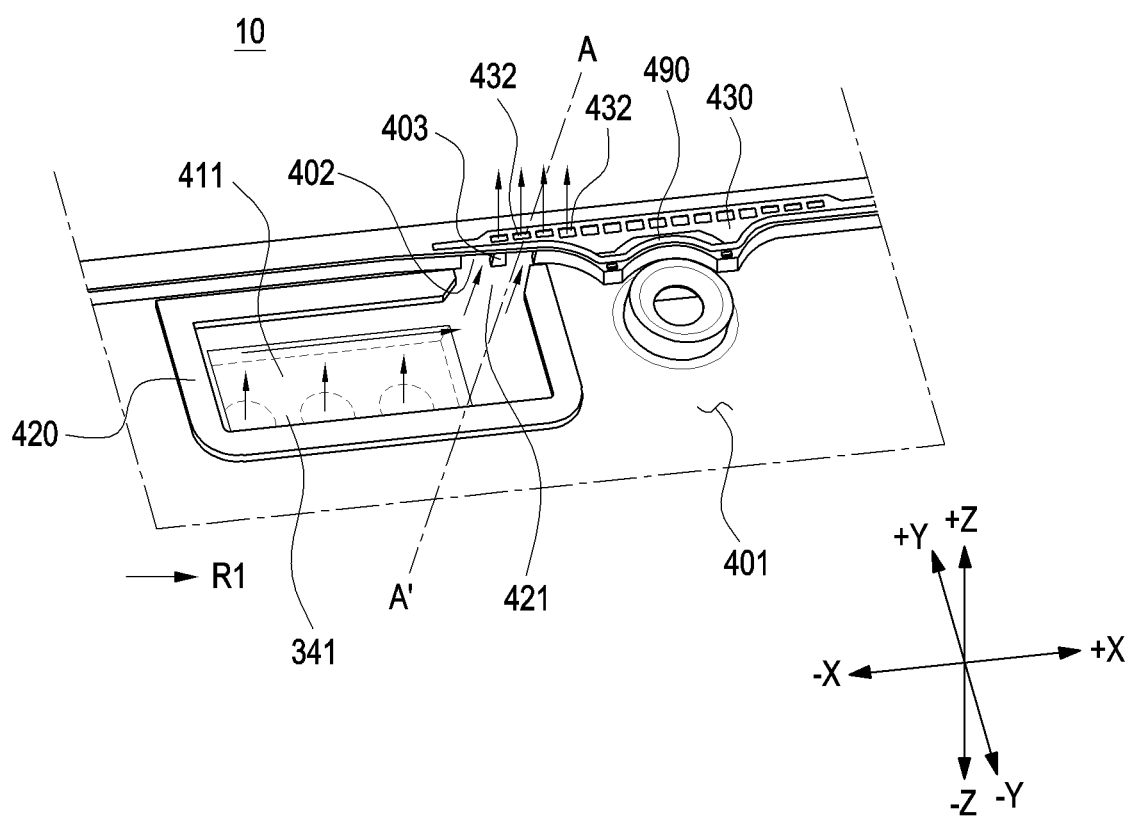
FIG. 6 is a view showing a support member to which elements of FIG. 5 are coupled according to an embodiment of the disclosure.

Referring to FIGS. 5 and 6, the duct structure 10 may include at least a part or all of a support member 400, a shielding member 420, and an auxiliary member 430. The description of the duct area A of FIG. 4 may be applied correspondingly to the description of the support member 400 of FIGS. 5 and 6, and all or a part of the support member 400 may be similar to or the same as the support member 311 of FIG. 4. According to an embodiment, the shielding member 420 may be configured to shield the leakage of sound emitted from a sound module (e.g., the sound module 341 of FIG. 4). According to an embodiment, the auxiliary member 430 may be configured to provide an emission path which allows sound emitted from the sound module 341 (see FIG. 4) to be emitted to the outside.

According to an embodiment, an inlet opening 411 may be formed through a front surface 401 of the support member 400. For example, the front surface 401 may mean a surface in a direction (the +Z-axis direction) in which a display module (e.g., the display module 330 of FIG. 4) of the support member 400 is disposed. The inlet opening 411 may be configured to provide a path into which sound emitted from the sound module 341 is introduced. According to an embodiment, the sound module 341 may be disposed in an accommodation portion (e.g., the accommodation portion 460 of FIG. 7) formed on the lower surface (for example, the rear surface of the front surface 401) of the support member 400. For example, the accommodation portion (e.g., the accommodation portion 460 of FIG. 7) may be formed at a position corresponding to the inlet opening 411. As another example, the sound module 341 may be disposed on the lower surface of the support member 400, which corresponds to the inlet opening 411, and may be configured to emit sound such that the emitted sound is delivered through the inlet opening 411.

According to an embodiment, the shielding member 420 may be disposed near the inlet opening 411. For example, a shielding member accommodation area 410 may be formed near the inlet opening 411, and the shielding member 420 may be seated in the shielding member accommodation area 410. For example, the inlet opening 411 is formed inside the shielding member accommodation area 410, and in order to prevent the leakage of sound emitted from the inlet opening 411, the shielding member 420 may be disposed in the shielding member accommodation area 410 so as to surround all or a part of the inlet opening 411. According to an embodiment, the shielding member accommodation area 410 may be formed as a concave part on the front surface 401.

According to an embodiment, a passing area 421, which is connected to a first discharge conduit 402, may be formed in a partial area of the shielding member 420. Sound emitted from the sound module 341 may be introduced into the first discharge conduit 402 through the passing area 421. According to an embodiment, the passing area 421 may be formed by cutting a part of the shielding member 420 so as to be formed as an incision area 421. For example, a part of the shielding member 420, which corresponds to the position of the first discharge conduit 402, may be cut, and thus sound emitted through the inlet opening 411 may be delivered to the first discharge conduit 402 via the incision area 421. However, it may be merely an example, and a passing area connected to the first discharge conduit 402 may be formed in a part of the shielding member 420 by various manners.

According to various embodiments, the first discharge conduit 402 may be formed on the front surface 401. According to an embodiment, sound, which is introduced from the sound module 341 through the inlet opening 411, may be emitted to the outside through the first discharge conduit 402. According to an embodiment, the first discharge conduit 402 may be formed in a partial area of a side wall 450 of the support member 400.

According to various embodiments, a sound output area 404 may be formed in at least a partial area of the support member 400. For example, the sound output area 404 may be formed by cut-processing or injection-molding the support member 400. As another example, the sound output area 404 may be formed by attaching a separate component to the support member 400. The sound output area 404 may include a sound output conduit 404a. The sound output conduit 404a may be formed as an opening in a part of the sound output area 404. For example, the sound output conduit 404a may be formed along the longitudinal direction of the sound output area 404. In addition, the sound output conduit 404a may be connected to the outside of the electronic device 100. According to an embodiment, the sound output conduit 404a may have one end connected to the first discharge conduit 402. For example, sound emitted from the sound module 341 may pass sequentially through the first discharge conduit 402 and the sound output conduit 404a, and then may be emitted to the outside.

According to various embodiments, the auxiliary member 430 may be disposed in the sound output area 404. The auxiliary member 430 may be disposed on the sound output area 404 so as to prevent foreign materials from being introduced into the sound output area 404. According to an embodiment, the auxiliary member 430 may include multiple openings 432. The multiple openings 432 may be arranged at positions corresponding to the sound output conduit 404a so as to deliver sound emitted from the sound output conduit 404a to the outside of the electronic device 100. According to an embodiment, the auxiliary member 430 may be disposed to overlap at least a part of the sound output conduit 404a, and thus sound emitted from the sound output conduit 404a may be delivered to the outside through the opening 432.

According to an embodiment, a support portion 403 may be formed in the first discharge conduit 402. For example, the support portion 403 may be configured to support at least a part of the auxiliary member 430. The support portion 403 may be configured to support at least a part of the auxiliary member 430, and thus it may be possible to prevent deformation of the auxiliary member 430 due to a load or external force. The support portion 403 may be formed as a protrusion in the first discharge conduit 402.

According to an embodiment, an adhesive member 490 may be disposed when the auxiliary member 430 is disposed on the sound output area 404. The adhesive member 490 may be disposed on all or a part of the side wall 450 and the auxiliary member 430 in order for attachment of the display module 330. The adhesive member 490 may include a liquid material, a solid material, and/or a semi-solid material. As will be described later, the display module 330 may be attached on the support member 400 so as to prevent sound emitted from the sound module 341 from leaking to the outside. In addition, the support member 400 and the display module 330 may be combined to form an emission path (e.g., see the first path 415 of FIG. 8)) of sound emitted from the sound module 341.

Figure 7:
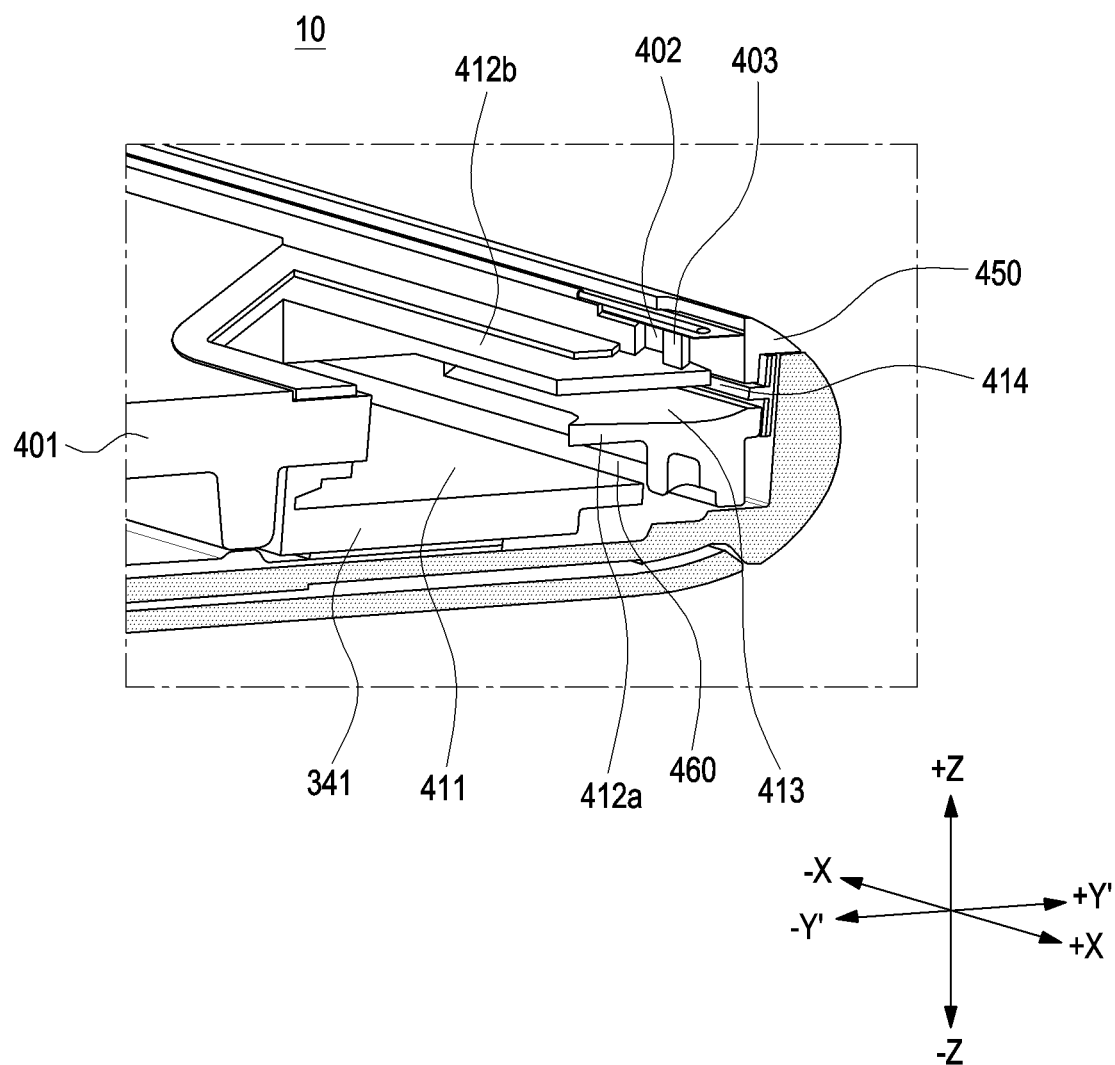
FIG. 7 is a view showing the cross-section A-A' of FIG. 6 according to an embodiment of the disclosure.

FIG. 7 is a view showing the cross-section A-A' of FIG. 6 according to an embodiment of the disclosure.

Referring to FIG. 7, the duct structure 10 may include a second conduit 413. According to an embodiment, the second conduit 413 may be connected to the inlet opening 411 so as to deliver sound emitted from the sound module 341 thereto. In the description of FIG. 7, the Y'-axis may be interpreted as an axis parallel to the A-A' axis of FIG. 6.

According to an embodiment, the second conduit 413 may be formed by at least a part of the support member 400, which extends therethrough. For example, the second conduit 413 may be formed in a space between a first surface 412a and a second surface 412b of the support member 400. For example, the first surface 412a may mean the upper surface of the shielding member accommodation area 410, and the second surface 412b may mean a lower surface of the shielding member accommodation area. According to an embodiment, the second conduit 413 may be connected to the inlet opening 411. For example, the second conduit 413 may be formed between the first surface 412a and the second surface 412b so as to be connected to at least a part of the inlet opening 411 extending through the shielding member accommodation area 410. In addition, the second conduit 413 may be formed in a direction different from that of the inlet opening 411. For example, when the inlet opening 411 is formed in a first direction, the second conduit 413 may be formed in a second direction different from the first direction. For example, the second direction and the first direction may be vertical.

According to an embodiment, a second discharge conduit 414 may be formed at the end of the second conduit 413. According to an embodiment, the second discharge conduit 414 may be provided as a space spaced between the support member 400 and the side wall 450. For example, the second discharge conduit 414 may be an opening formed between the support member 400 and at least a part of the side wall 450. The second discharge conduit 414 may be connected to the second conduit 413. According to an embodiment, the second discharge conduit 414 may be connected to the sound output conduit 404a.

According to various embodiments, sound emitted through the second conduit 413 may be added with sound emitted through a first conduit (e.g., the first conduit 415 of FIG. 9) in the sound output conduit 404a, and then may be emitted to the outside. In the following description of the disclosure, the structure of the first conduit, and a sound path passing through the first conduit and the second conduit according to various embodiments will be described with reference to the drawings.

Figure 8:
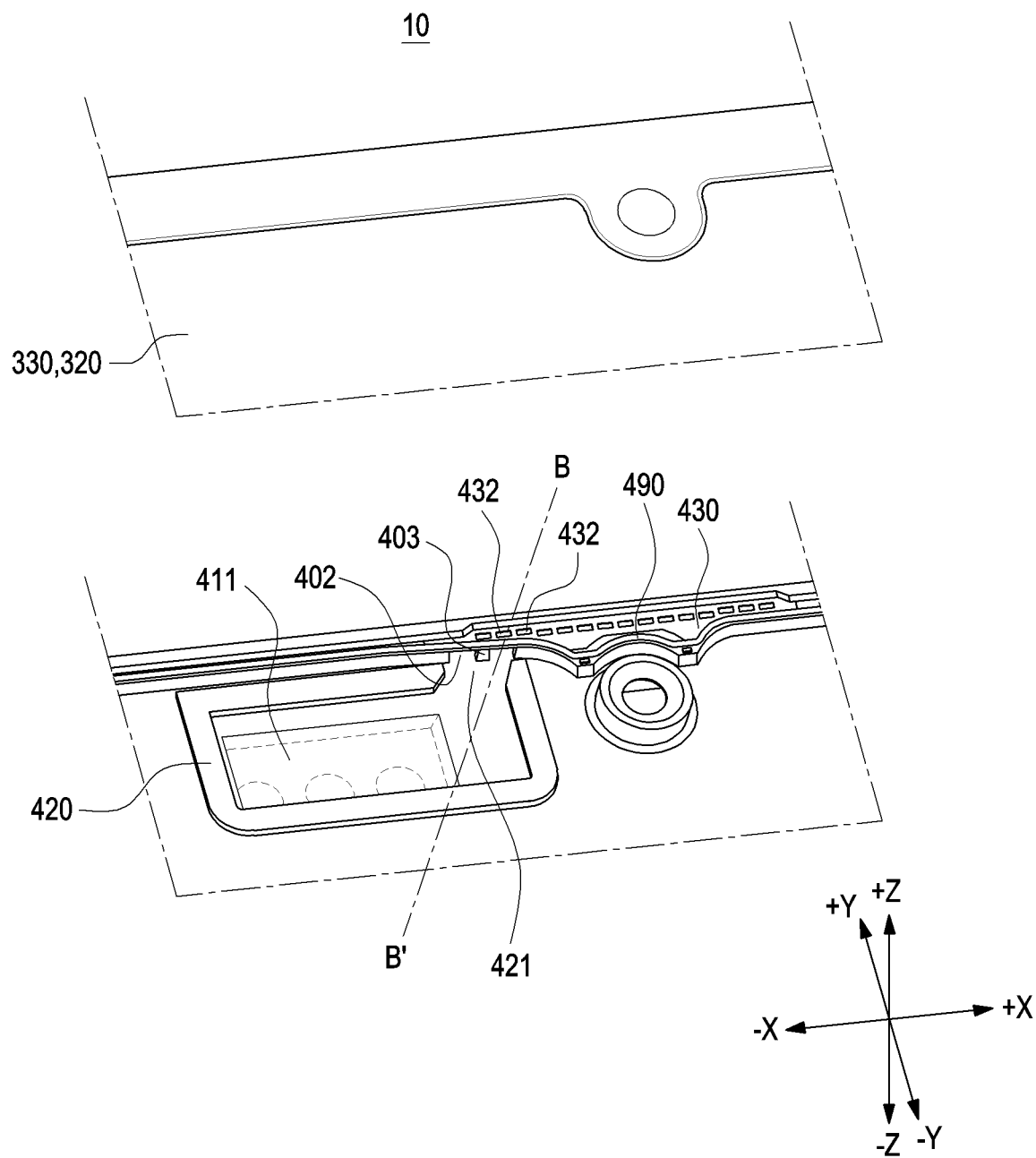
FIG. 8 is an exploded perspective view showing that a display module is coupled to the structure of FIG. 6 according to an embodiment of the disclosure.
Figure 9:
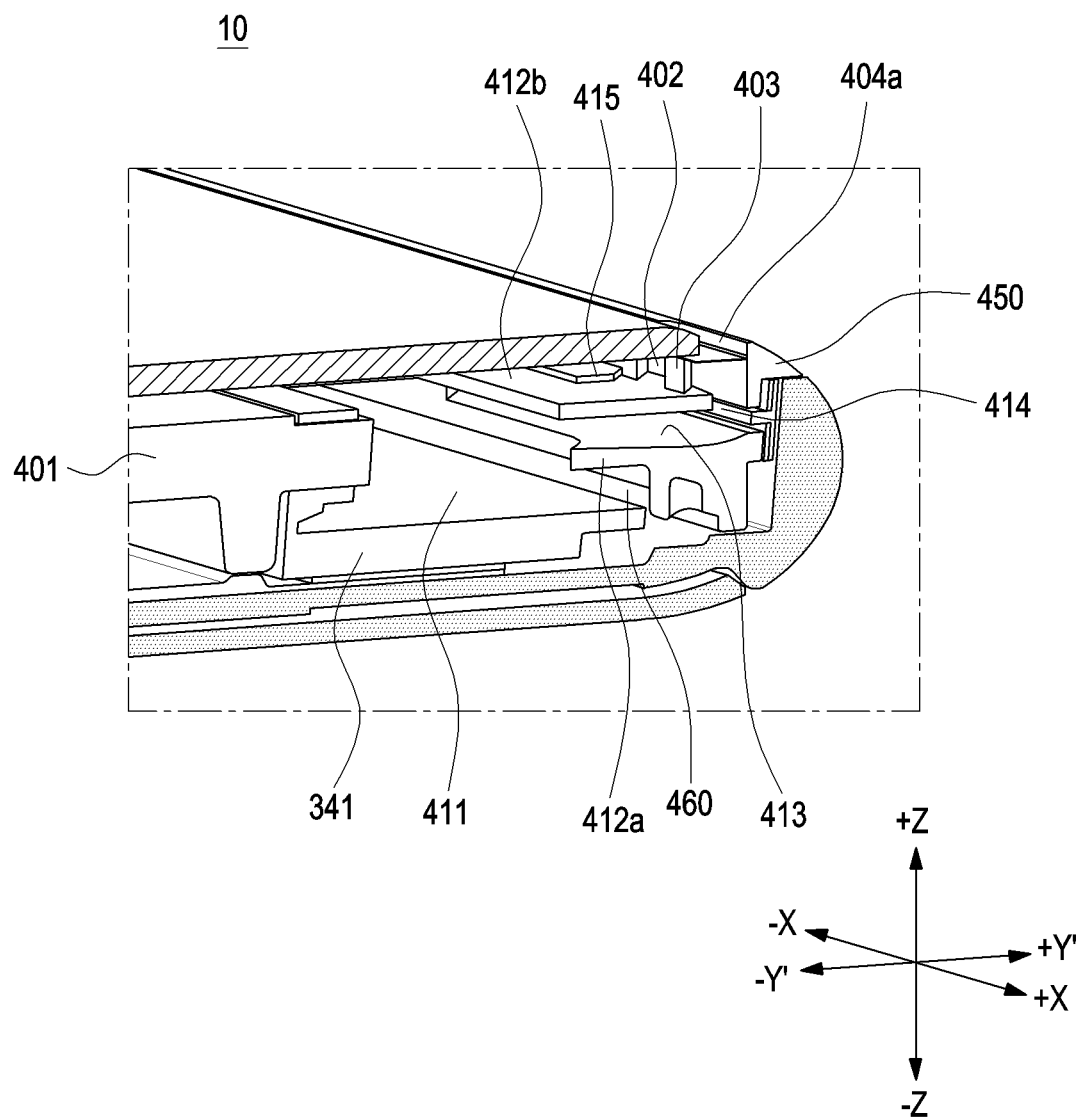
FIG. 9 is a view showing the cross-section B-B' of FIG. 8 according to an embodiment of the disclosure.

FIG. 8 is an exploded perspective view showing that a display module is coupled to the duct structure of FIG. 6 according to an embodiment of the disclosure. FIG. 9 is a view showing the cross-section B-B' of FIG. 8 according to an embodiment of the disclosure. The Y'-axis of FIG. 9 may be interpreted as an axis parallel to the B-B' axis of FIG. 8.

Referring to FIGS. 8 and 9, the display module 330 may be attached to the support member 400. According to an embodiment, the display module 330 may adhere onto the support member 400 through the adhesive member 490. According to an embodiment, the display module 330 and the support member 400 may be combined to form the first conduit 415. According to an embodiment, the display module 330 may adhere to the support member 400 through the adhesive member 490 so as to prevent sound from leaking to the outside through the first conduit 415. In the above and below description of the specification, for the convenience of explanation, although only a combination of the support member 400 and the display module 330 is described, the concept of the disclosure may not be limited thereto. The display module 330 may be coupled to the front plate 320 so as to be coupled to the support member 400, the front plate 320 and the support member 400 may be coupled to provide the duct structure 10, and also it may be understood that various changes of embodiments are possible.

According to an embodiment, the display module 330 may be disposed on the auxiliary member 430. In addition, the display module 330 may be disposed to be spaced apart from at least a part of the side wall 450 such that sound is emitted to the outside through the opening 432 (see FIG. 6). For example, a space, in which at least a part of the display module 330 and the side wall 450 are spaced apart each other, may be configured to be provided as a sound charge conduit 415.

According to an embodiment, the first conduit 415 may be formed between the display module 330 and the support member 400. For example, a space between the display module 330 and the first surface 412a may be configured to be provided as the first conduit 415. According to an embodiment, the first conduit 415 may be connected to the first discharge conduit 402.

According to an embodiment, the first conduit 415 may be connected to the inlet opening 411. For example, when the inlet opening 411 is formed to extend through the second surface 412b from the first surface 412a of the support member 400, the first conduit 415, which is formed between the display module 330 and the upper surface 412b, may be connected to the inlet opening 411.

According to an embodiment, the first conduit 415 and the second conduit 413 may be arranged side by side. For example, with reference to the first surface 412a, the first conduit 415 may be formed above the first surface 412a, and the second conduit 413 may be formed below the first surface 412a. For example, the first conduit 415 and the second conduit 413 may be positioned in opposite directions with reference to the first surface 412a.

According to an embodiment, the first conduit 415 and the second conduit 413 may be arranged in the same direction. In addition, the first conduit 415 and the second conduit 413 may be formed in a direction different from that of the inlet opening 411. For example, when the inlet opening 411 is formed in a direction (e.g., a direction passing through the support member 400) from the first surface 412a toward the second surface 412b, the first conduit 415 and the second conduit 413 may be formed in the width direction (or the length direction) of the support member 400. According to an embodiment, the first conduit 415 and the second conduit 413 may be formed in a direction substantially perpendicular to the direction in which the inlet opening 411 is formed.

Figure 10:
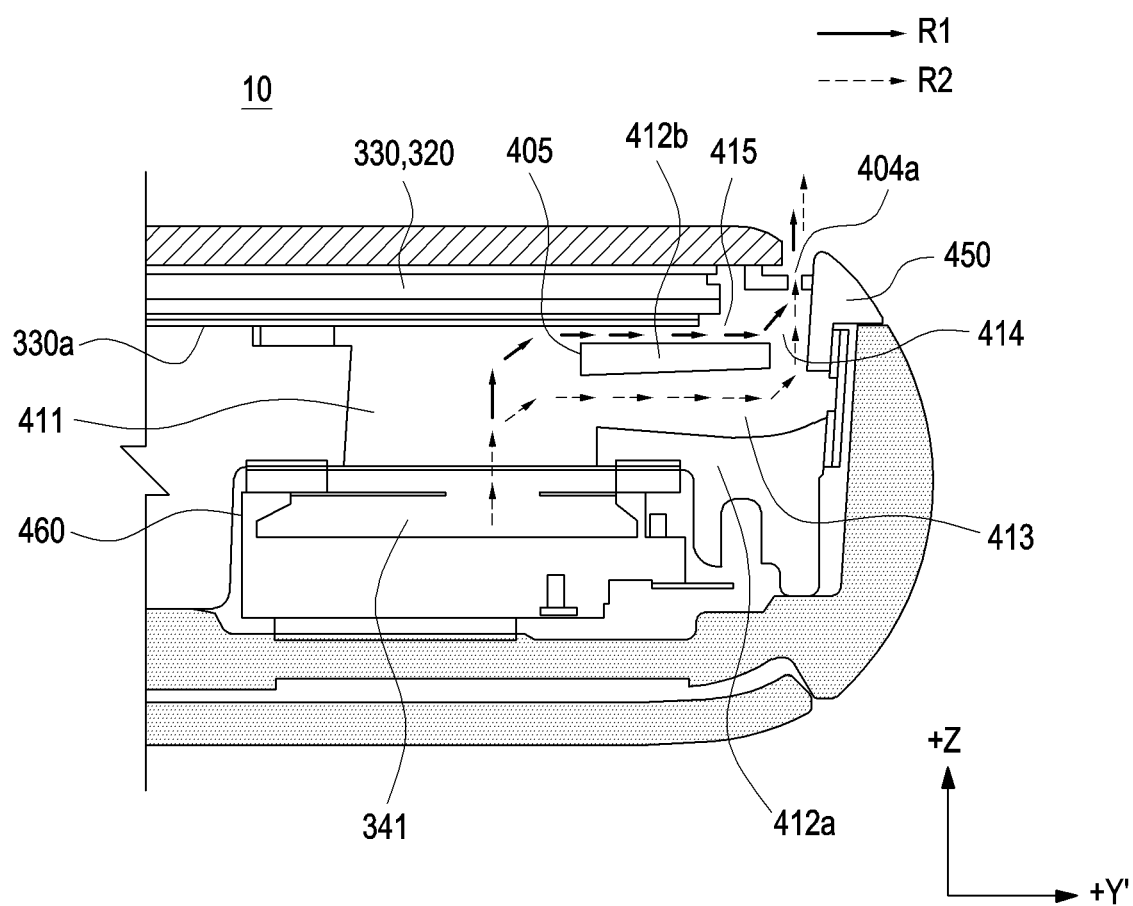
FIG. 10 is a view showing a sound path of a duct structure according to an embodiment of the disclosure.

FIG. 10 is a view showing a sound path of a duct structure according to an embodiment of the disclosure.

The Y'-axis of FIG. 10 may be interpreted as an axis parallel to the B-B' axis of FIG. 8.

Referring to FIG. 10, the duct structure 10 may include the first conduit 415 and the second conduit 413. All or a part of the configuration of the duct structure 10 of FIG. 10 may be the same as or similar to the configuration of the duct structure 10 described in FIGS. 5 to 9, and thus overlapping descriptions will be omitted. According to an embodiment, sound emitted from the sound module 341 may be emitted to the outside through the first conduit 415 and the second conduit 413. In the following description of the disclosure, the path of sound passing through the first conduit 415 may be referred to as a 'first path R1', and the path of sound passing through the second conduit 413 may be referred to as a 'second path R2'.

According to an embodiment, sound emitted from the sound module 341 may be introduced into the inlet opening 411. As described above, according to an embodiment, the inlet opening 411 may be connected to the accommodation portion 460, and thus may be configured to receive sound emitted from the sound module 341 mounted in the accommodation portion 460.

According to an embodiment, sound passing through the inlet opening 411 may be branched so as to pass through the first conduit 415 and the second conduit 413. For example, sound introduced into the inlet opening 411 may enter each of the first conduit 415 and the second conduit 413 which are branched with reference to a portion 405 of the second surface 412b. For example, sound emitted from the sound module 341 may travel to the inlet opening 411 which is a common path, and then may be branched to be delivered to the first path R1 and the second path R2. For example, it may be also expressed that the first path R1 and the second path R2 have a common path with respect to the first direction (the +Z-axis direction) in at least a part of the inlet opening 411, and are branched in the second direction (the +Y'-axis direction) in the inlet opening 411.

According to an embodiment, the first path R1 and the second path R2 may be combined in the sound output conduit 404a. For example, sounds, which are branched to the first path R1 and the second path R2 and then travels, may overlap each other in the sound output conduit 404a, and then may be delivered to the outside through one path.

Figure 11:
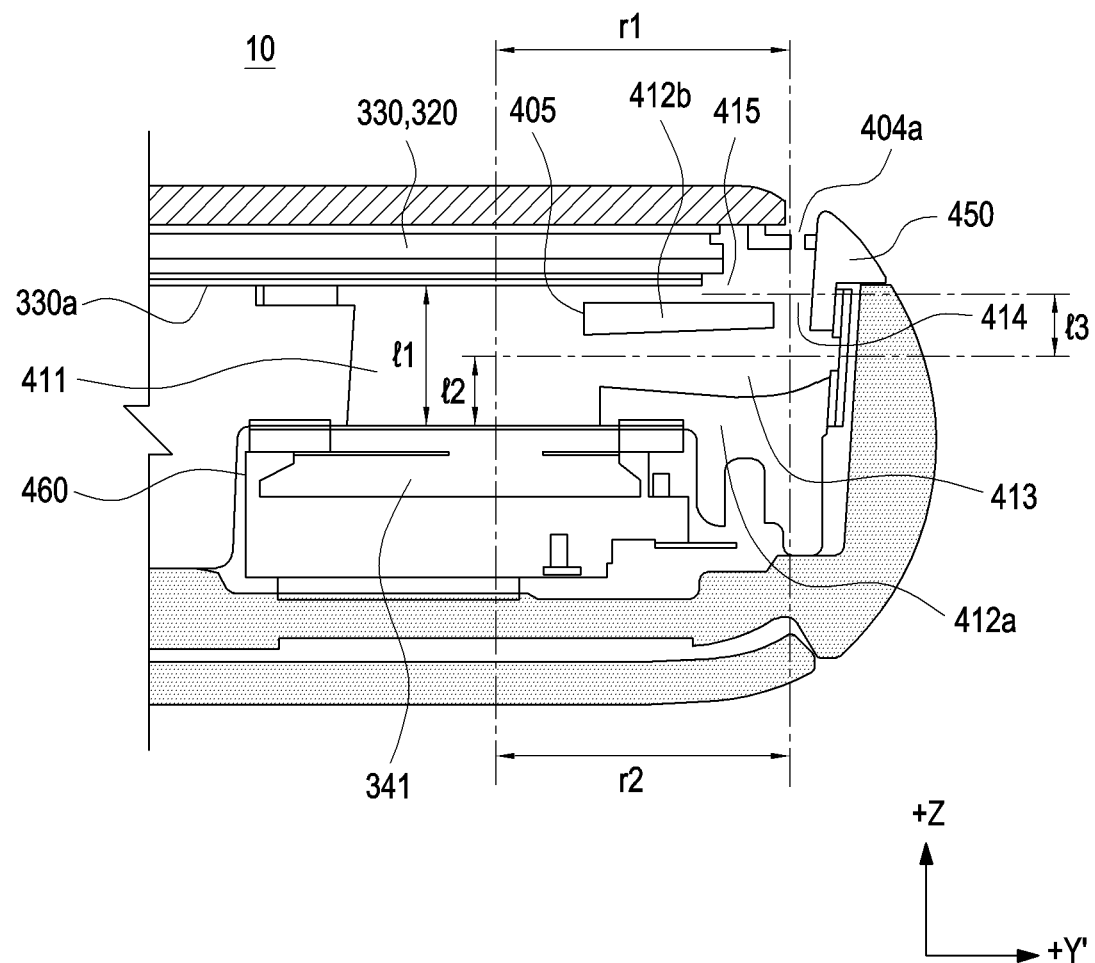
FIG. 11 is a view showing the length of a sound conduit according to an embodiment of the disclosure.

FIG. 11 is a view showing the length of a sound conduit according to an embodiment of the disclosure.

The Y'-axis of FIG. 11 may be interpreted as an axis parallel to the B-B' axis of FIG. 8.

Referring to FIG. 11, the lengths of the first path R1 and the second path R2 may be formed to satisfy a predetermined condition. For example, the predetermined condition may be determined by the wavelength or frequency of sound emitted from the sound module 341.

According to an embodiment, the first path R1 and the second path R2 may have lengths corresponding to each other. For example, the first path R1 and the second path R2 may have a substantially identical length or similar lengths. Since the first path R1 and the second path R2 have lengths corresponding to each other, sound quality may be improved when sound passing through the first path R1 and the second path R2 are added.

According to an embodiment, the distance l1 (hereinafter, referred to as a 'first vertical distance') from the sound module 341 to the first conduit 415 in the first direction (e.g., the +Z-axis direction) may be configured to correspond to the distance l2 (hereinafter, referred to as a 'second vertical distance') from the sound module 341 to the second conduit 413 in the first direction and the distance l3 (hereinafter, referred to as a 'third vertical distance') from the second conduit 413 to the first conduit 415 in the first direction. In addition, according to an embodiment, the length r1 (hereinafter, referred to as a 'first horizontal distance') of the first conduit 415 in the second direction (e.g., the x-axis direction) may be configured to correspond to the length r2 (hereinafter, referred to as a 'second horizontal distance') of the second conduit 413 in the second direction (e.g., the x-axis direction). For example, the first vertical distance l1 may be configured to correspond to the sum of the second and third vertical distances l2 and l3, and the first horizontal distance r1 and the second horizontal distance r2 may be configured to correspond to each other. Therefore, the travel distances of sound passing through the first path R1 and the second path R2 may correspond to each other. As the travel distances of sound passing through the first path R1 and the second path R2 correspond to each other, when each sound overlaps, sounds having substantially the same wavelength band or similar wavelength bands may overlap each other so that the quality of sound emitted to the outside is improved. As another example, the difference in length between the first path R1 and the second path R2 may be configured to be related to the wavelength of sound emitted from the sound module 341.

According to an embodiment, sound passing through the first path R1 and the second path R2 may be added in the sound output conduit 404*a*, and then may be output to the outside.

Figure 12A:
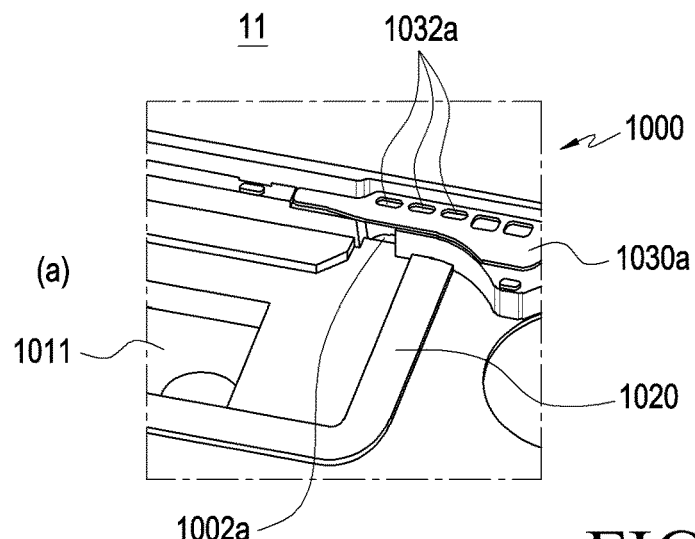
FIGS. 12A, 12B, and 12C illustrate a part of a duct structure according to various embodiments of the disclosure.
Figure 12B:
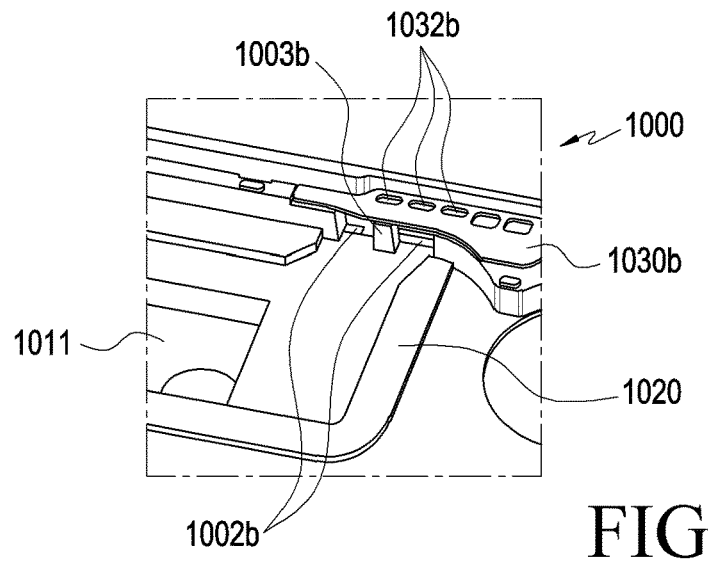
Figure 12C:
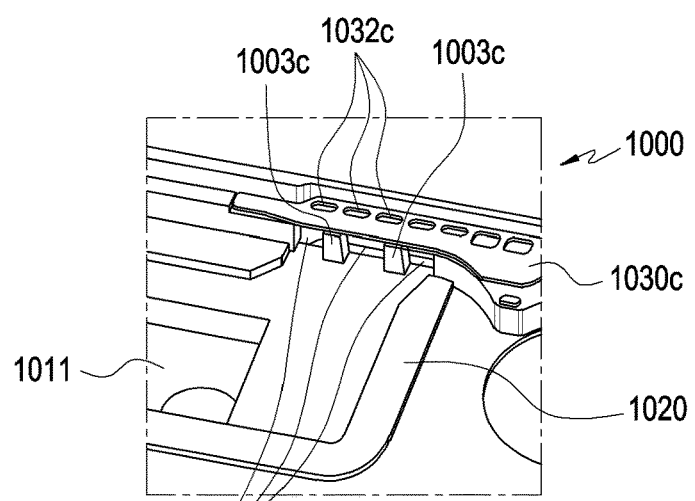

FIGS. 12A to 12C illustrate a part of a duct structure according to various embodiments of the disclosure.

Referring to FIGS. 12A to 12C, a support member 1000 may include an inlet opening 1011, a shielding member 1020, and an auxiliary member 1030*a*, 1030*b*, or 1030*c*.

All or a part of the configuration of the support member 1000, the inlet opening 1011, the shielding member 1020, and the auxiliary member 1030*a*, 1030*b*, or 1030*c* of FIGS. 12A to 12C may be the same as or similar to the configuration of the support member 400, the inlet opening 411, the shielding member 420, and the auxiliary member 430 of FIGS. 5 to 9, and thus overlapping descriptions will be omitted.

According to various embodiments, the size of a first discharge conduit 1002*a*, 1002*b*, or 1002*c* may be various. For example, the shape and size of the first discharge conduit 1002*a*, 1002*b*, or 1002*c* may be determined. According to an embodiment, the support member 1000 may have multiple numbers of support portions 1003*b* or 1003*c* formed therein.

According to various embodiments, the support portion 1003*b* or 1003*c* may have a changeable number or may not be formed. For example, when the first discharge conduit 1002*a* is configured to have a small size, the support portion may not be formed. As another example, when the first discharge conduit 1002*c* is configured to have a relatively large size, multiple support portions 1003*c* may be formed.

According to an embodiment, as the size of the first discharge conduit 1002*a*, 1002*b*, or 1002*c* increases, the area of the auxiliary member 1030*a*, 1030*b*, or 1030*c* disposed on the first discharge conduit 1002*a*, 1002*b*, or 1002*c* may be increased. In the case, in order to prevent deformation of the auxiliary member 1030*a*, 1030*b*, or 1030*c* due to the load thereof, the support portion 1003*b* or 1003*c* may be formed, and as the size of the first discharge conduit 1002*b* or 1002*c* increases, a larger number of the support portions 1003*b* or 1003*c* may be formed. In addition, since the deformation of the auxiliary member 1030*a*, 1030*b*, or 1030*c* is prevented, it may be possible to prevent foreign materials from entering an opening 1032*a*, 1032*b*, or 1032*c* or the first discharge conduit 1002*a*, 1002*b*, or 1002*c*.

FIGS. 13A to 13F are views showing a duct structure and a manufacturing process thereof according to various embodiments of the disclosure.

Referring to FIGS. 13A to 13F, the auxiliary member 430 and the support member 400 exemplarily described in FIGS. 5 and 6 may be integrally formed. For example, after a support member 1100*a* is shaped, a support member 1100*e*, with which an auxiliary member is integrated, may be provided by performing an additional process on the support member 1100*a*. All or a part of the configuration of each of support members 1100*a*, 1100*b*, 1100*c*, 1100*d*, and 1100*e* of the FIGS. 13A to 13F may be the same as that of the support member 311 of the FIG. 4. In addition, FIGS. 13A to 13F show a processing process which may be performed on the duct area A of FIG. 4.

According to various embodiments, an additional process may be performed on the support member 1100 after being injected. Referring to FIG. 13A, the support member 1100*a* may be shaped to include all or a part of an inlet opening 1111, a shielding member accommodation area 1110, and a sound emission area 1104 including a sound charge conduit 1104*a*. All or a part of the configuration of the inlet opening 1111, the shielding member accommodation area 1110, and the sound emission area 1104 including the sound charge conduit 1104*a* of FIGS. 13A to 13F may be the same as or similar to that of the inlet opening 411, the shielding member accommodation area 410, and the sound emission area 404 described above in FIGS. 5 and 6, and thus overlapping descriptions will be omitted.

Referring to FIGS. 13B and 13C, the support member 1100*b* may be machined to form a first discharge opening 1103*a*. According to an embodiment, a cutting process may be performed on the support member 1100*b* (see FIG. 13B). For example, the cutting process may be performed using a computer numerical control (CNC). According to an embodiment, by using various cutting members 1199, a first discharge conduit 1102*c* may be formed in the support member 1100*b*. The first discharge conduit 1102*c* may be formed to be connected to the sound charge conduit 1104*a*.

Referring to FIGS. 13D and 13E, after the first discharge conduit 1102*c* is formed, a shielding member 1120 may be attached thereto (e.g., the support member 1100*d* to which the shielding member 1120 is attached). In addition, an adhesive member 1190 may be disposed (e.g., the support member 1100*e* on which the adhesive member 1190 is disposed). All or a part of contents related to the shielding member 1120 or the adhesive member 1190 may be the same as or similar to the contents of the shielding member 420 or the adhesive member 1190 of FIGS. 5 and 6, and thus overlapping descriptions will be omitted.

Referring to FIGS. 13E and 13F, after the adhesive member 1190 is applied, the display module 330 may be attached to the support member 1100*e*. As described above, the display module 330 and the support member 1100*e* may be combined to provide the first conduit 415 (see FIGS. 6 to 10) of sound emitted from the sound module 341.

An electronic device according to various embodiments may include: a sound module (e.g., the sound module 341 of FIG. 4); a support member (e.g., the support member 400 of FIG. 5) including an accommodation space (e.g., the accommodation space 460 of FIG. 8) configured to accommodate the sound module; a display module (e.g., the display 330 of FIG. 4) disposed above the support member; and a duct structure (e.g., the duct structure 10 of FIG. 8) configured to deliver sound generated in the sound module to the outside, wherein the duct structure may include: an inlet space (e.g., the inlet opening 411 of FIG. 10) formed to be at least partially surrounded by the support member and positioned between the sound module and the display module such that sound generated in the sound module is introduced therein; a first conduit (e.g., the first conduit 415 of FIG. 10) branched from the inlet space in a first direction and formed to extend through at least a part of the support member; a second conduit (e.g., the second conduit 413 of FIG. 10) disposed side by side with the first conduit, branched from the inlet space in a second direction, and formed along between the display module and the support member; and an output space (e.g., the sound output opening 404*a* of FIG. 10) connected to the first conduit and the second conduit and disposed adjacent to an outlet of the sound, wherein the first conduit and the second conduit may have lengths corresponding to each other.

According to an embodiment, the first conduit and the second conduit may have a substantially identical length.

According to an embodiment, the inlet space may be formed to extend through the support member from the lower surface to the upper surface of the support member along the second direction.

According to an embodiment, the first direction and the second direction may be perpendicular to each other.

According to an embodiment, the support member may include an output portion (e.g., the sound output area 404 of FIG. 10) formed by a part of a side wall thereof, which protrudes, and the output space may be formed as an opening in at least a part of the output portion.

According to an embodiment, the output space has a first outlet (e.g., the first output opening 402 of FIG. 6) formed at the end thereof and connected to the first conduit, and the first outlet is formed as an opening along the first direction at one end of the output portion.

According to an embodiment, the electronic device may further include a shielding member; and the shielding member may be disposed on the upper surface of the support member so as to surround an inlet opening.

According to an embodiment, the shielding member may include an incision area (e.g., the incision area 421 of FIG. 6) in which at least a part thereof is cut, and the incision area may be disposed at a position corresponding to the first outlet.

According to an embodiment, an auxiliary member (e.g., the auxiliary member 430 of FIG. 5), which is disposed on the output portion, may be further included therein; and the auxiliary member may be disposed on the side wall of the support member such that a side thereof overlaps above a first discharge conduit.

According to an embodiment, the support member may include a support portion formed inside the first outlet, and the support portion may be configured to support a side of the auxiliary member.

According to an embodiment, the sound module may be disposed on the rear surface of the support member, which corresponds to the inlet portion.

According to an embodiment, the auxiliary member may include multiple openings (e.g., the opening 432 of FIG. 5), and the multiple openings may be connected to the output space.

According to an embodiment, the display module may adhere to the support member through an adhesive member (e.g., the adhesive member 490 of FIG. 6) so as to shield sound of the second conduit.

According to an embodiment, the support member may have an accommodation area (e.g., the shielding member accommodation area 410 of FIG. 6) formed on the upper surface thereof and formed to surround the inlet opening, and the shielding member may be disposed in the accommodation area.

According to an embodiment, the support portion (e.g., the support portion 403 of FIG. 5) may be formed as multiple protrusions.

According to an embodiment, the first outlet may be formed by a cutting process.

According to various embodiments, provided may be an electronic device including: a sound module; a support member including an accommodation space formed on the rear surface thereof so as to accommodate the sound module; a display module disposed on the upper surface of the support member; and a duct structure configured to deliver sound generated in the sound module to the outside, wherein the duct structure includes: an inlet space formed to extend from the accommodation space to the upper surface of the support member along a first direction and configured to allow sound generated in the sound module to be introduced thereinto; a first conduit branched from the inlet space and formed to pass through at least a part of a front case in a second direction different from the first direction; a second conduit formed along between the display module and the front case and branched from the inlet space along the second direction; and an output space formed between the display module and a side wall of the support member and connected to the first conduit and the second conduit such that sound travelling through the first conduit and sound travelling through the second conduit overlap each other, wherein travel paths (e.g., the travel paths of R1 and R2 of FIG. 11) of sound travelling through the first conduit and sound travelling through the second conduit may have a substantially identical length.

According to an embodiment, the first direction and the second direction may be perpendicular to each other.

According to an embodiment, a shielding member may be further included therein, and the shielding member may be disposed to surround an inlet opening.

According to an embodiment, the first conduit and the second conduit may be arranged to be parallel to each other.

Although specific embodiments have been described in the detailed description of the disclosure, it will be apparent to those skilled in the art that various modifications and changes may be made thereto without departing from the scope of the disclosure.

DESCRIPTION OF REFERENCE NUMERALS

100, 300: Electronic device
400: Support member
411: Inlet opening
415: First conduit
413: Second conduit
341: Sound module

What is claimed is:

1. An electronic device comprising:
    a sound module;
    a support member comprising an accommodation space configured to accommodate the sound module;
    a display module disposed above the support member; and
    a duct structure configured to deliver sound generated in the sound module to outside of the electronic device,
    wherein the duct structure comprises:
        an inlet space formed to be at least partially surrounded by the support member, and positioned between the sound module and the display module such that sound generated in the sound module is introduced therein,
        a first conduit branched from the inlet space in a first direction, and formed along between the display module and the support member,
        a second conduit disposed side by side with the first conduit, branched from the inlet space in a second direction, and formed to extend through at least a part of the support member, and
        an output space connected to the first conduit and the second conduit, and disposed adjacent to an outlet of the sound,
    wherein the first conduit and the second conduit have lengths corresponding to each other, and
    wherein at least a part of the first conduit is disposed between the display module and at least a part of the second conduit and is formed by the display module and the support member.

2. The electronic device of claim 1, wherein the first conduit and the second conduit have a substantially identical length.

3. The electronic device of claim 1, wherein the inlet space is formed to extend through the support member from a lower surface to an upper surface of the support member along a third direction.

4. The electronic device of claim 3, wherein the first direction and the second direction are perpendicular to the third direction.

5. The electronic device of claim 1,
wherein the support member comprises an output portion formed by a part of a side wall thereof, which protrudes, and
wherein the output space is formed as an opening in at least a part of the output portion.

6. The electronic device of claim 5,
wherein the output space has a first outlet formed at an end thereof and connected to the first conduit, and
wherein the first outlet is formed as an opening along the first direction at one end of the output portion.

7. The electronic device of claim 6, further comprising:
a shielding member,
wherein the shielding member is disposed on an upper surface of the support member so as to surround the inlet space.

8. The electronic device of claim 7,
wherein the shielding member comprises a passing area configured to allow the sound to pass therethrough, and
wherein the passing area is disposed at a position corresponding to the first outlet.

9. The electronic device of claim 6, further comprising:
an auxiliary member disposed above the output portion,
wherein the auxiliary member is disposed on the side wall of the support member such that a side thereof overlaps above a first discharge conduit.

10. The electronic device of claim 9,
wherein the support member comprises a support portion formed inside the first outlet, and
wherein the support portion is configured to support a side of the auxiliary member.

11. The electronic device of claim 9,
wherein the auxiliary member comprises multiple openings, and
wherein the multiple openings are connected to the output space.

12. The electronic device of claim 7,
wherein the support member has a shielding member accommodation area formed on the upper surface thereof and formed to surround the inlet space, and
wherein the shielding member is disposed in the shielding member accommodation area.

13. The electronic device of claim 10, wherein the support portion is formed as multiple protrusions.

14. The electronic device of claim 6, wherein the first outlet is formed by injection-molding or by cutting.

15. The electronic device of claim 1, wherein the sound module is disposed on a rear surface of the support member, which corresponds to the inlet space.

16. The electronic device of claim 1, wherein the display module adheres to the support member through an adhesive member so as to shield sound of the second conduit.

17. An electronic device comprising:
a sound module;
a support member comprising an accommodation space formed on a rear surface thereof so as to accommodate the sound module;
a display module disposed on an upper surface of the support member; and
a duct structure configured to deliver sound generated in the sound module to outside of the electronic device,
wherein the duct structure comprises:
an inlet space formed to extend from the accommodation space to the upper surface of the support member along a first direction and configured to allow sound generated in the sound module to be introduced thereinto,
a first conduit branched from the inlet space in a second direction different from the first direction, and formed between the display module and a front case,
a second conduit branched from the inlet space along the second direction, and formed to extend through at least a part of the front case, and
an output space formed between the display module and a side wall of the support member, connected to the first conduit and the second conduit such that sound travelling through the first conduit and sound travelling through the second conduit are introduced to the output space,
wherein travel paths of sound travelling through the first conduit and sound travelling through the second conduit have a substantially identical length,
wherein at least a part of the first conduit is disposed between the display module and at least a part of the second conduit and is formed by the display module and the support member, and
wherein sound travelling through the output space is output to the outside of the electronic device in the first direction.

18. The electronic device of claim 17, wherein the first direction and the second direction are perpendicular to each other.

19. The electronic device of claim 17, further comprising:
a shielding member,
wherein the shielding member is disposed to surround the inlet space.

20. The electronic device of claim 17, wherein the first conduit and the second conduit are arranged to be parallel to each other.

* * * * *